(12) United States Patent
Sakai

(10) Patent No.: US 9,182,538 B2
(45) Date of Patent: Nov. 10, 2015

(54) PLANAR LIGHT SOURCE DEVICE AND DISPLAY APPARATUS INCORPORATING SAME

(71) Applicant: Mitsubishi Electric Corporation, Chiyoda-ku (JP)

(72) Inventor: Seiji Sakai, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/162,254

(22) Filed: Jan. 23, 2014

(65) Prior Publication Data

US 2014/0133180 A1     May 15, 2014

Related U.S. Application Data

(63) Continuation of application No. 12/570,732, filed on Sep. 30, 2009.

(30) Foreign Application Priority Data

Oct. 1, 2008    (JP) .................................. 2008-256315

(51) Int. Cl.
    *F21V 8/00*          (2006.01)
    *G02F 1/1335*      (2006.01)

(52) U.S. Cl.
    CPC ............ *G02B 6/0091* (2013.01); *G02B 6/0016* (2013.01); *G02F 1/133611* (2013.01); *G02B 6/0021* (2013.01); *G02B 6/0031* (2013.01); *G02F 1/133603* (2013.01)

(58) Field of Classification Search
    CPC .. G02B 6/0038; G02B 6/0053; G02B 6/0036; G02B 6/0028; G02B 6/0068; G02B 6/0021; G02B 6/0051; G02B 6/0061; G02B 1/133603
    USPC ................. 362/97.1, 606, 610, 612, 615, 617
    See application file for complete search history.

(56) References Cited

U.S. PATENT DOCUMENTS

| | | | |
|---|---|---|---|
| 5,839,812 | A | 11/1998 | Ge et al. |
| 6,425,673 | B1 | 7/2002 | Suga et al. |
| 6,964,500 | B2 | 11/2005 | Sakai |
| 6,967,698 | B2 | 11/2005 | Tanoue et al. |
| 7,229,198 | B2 | 6/2007 | Sakai et al. |

(Continued)

FOREIGN PATENT DOCUMENTS

| | | |
|---|---|---|
| JP | 10-82916 | 3/1998 |
| JP | 10-104620 | 4/1998 |

(Continued)

*Primary Examiner* — Jong-Suk (James) Lee
*Assistant Examiner* — Mark Tsidulko
(74) *Attorney, Agent, or Firm* — Oblon, McClelland, Maier & Neustadt, L.L.P.

(57) ABSTRACT

A planar light source device with highly uniform intensity and high light utilization efficiency, and a display apparatus incorporating the same, are provided. A light guide plate, configured by a material such as plate-shaped and transparent acryl resin, polycarbonate resin, or glass, causes incident light to propagate within the light guide plate and then to exit the light through an exit surface as a surface emitting light. A first recess is formed substantially in the center of the exit surface. The first recess is cylinder-shaped, and on a bottom thereof is provided a lens that refracts incident light from a light source, in a direction away from the center of a circle on the bottom.

12 Claims, 11 Drawing Sheets

(56) References Cited

U.S. PATENT DOCUMENTS

| | | | |
|---|---|---|---|
| 7,254,309 B1* | 8/2007 | Chou et al. | 385/146 |
| 7,281,860 B2* | 10/2007 | Fujita | 385/88 |
| 7,350,951 B2 | 4/2008 | Sakai et al. | |
| 7,379,117 B2* | 5/2008 | Hwang | 348/371 |
| 7,384,179 B2 | 6/2008 | Sakai | |
| 7,393,128 B2 | 7/2008 | Sakai et al. | |
| 7,441,938 B2 | 10/2008 | Sakai et al. | |
| 7,458,714 B2* | 12/2008 | Chang | 362/626 |
| 7,465,075 B2 | 12/2008 | Chinniah et al. | |
| 7,604,389 B2 | 10/2009 | Sakai et al. | |
| 7,641,376 B2 | 1/2010 | Sakai et al. | |
| 7,654,687 B2 | 2/2010 | Tsai et al. | |
| 7,794,129 B2* | 9/2010 | Tien et al. | 362/606 |
| 7,855,511 B2 | 12/2010 | Espiau et al. | |
| 7,896,524 B2 | 3/2011 | Yoneda et al. | |
| 7,959,343 B2 | 6/2011 | Ijzerman et al. | |
| 2002/0097578 A1* | 7/2002 | Greiner | 362/240 |
| 2004/0184707 A1 | 9/2004 | Jewell et al. | |
| 2006/0028842 A1 | 2/2006 | Kim et al. | |
| 2006/0083017 A1* | 4/2006 | Wang et al. | 362/547 |
| 2006/0124953 A1 | 6/2006 | Negley et al. | |
| 2007/0002588 A1 | 1/2007 | Tseng | |
| 2007/0058359 A1 | 3/2007 | Saitoh et al. | |
| 2007/0086179 A1* | 4/2007 | Chen et al. | 362/27 |
| 2007/0121340 A1 | 5/2007 | Hoshi | |
| 2007/0147073 A1* | 6/2007 | Sakai et al. | 362/607 |
| 2008/0211990 A1 | 9/2008 | Sakai | |
| 2008/0264910 A1 | 10/2008 | Kashyap et al. | |
| 2008/0291694 A1 | 11/2008 | Sakai et al. | |
| 2012/0127400 A1 | 5/2012 | Yuuki et al. | |
| 2012/0140519 A1 | 6/2012 | Sakai | |
| 2012/0307519 A1 | 12/2012 | Sakai | |

FOREIGN PATENT DOCUMENTS

| | | |
|---|---|---|
| JP | 3427636 | 5/2003 |
| JP | 2005-93622 | 4/2005 |
| JP | 2005-135815 A | 5/2005 |
| JP | 2006-278309 | 10/2006 |
| JP | 2006-286217 | 10/2006 |
| JP | 2007-80595 | 3/2007 |
| JP | 2007-95674 | 4/2007 |
| JP | 2007-149451 | 6/2007 |
| JP | 2007-188863 | 7/2007 |
| JP | 2007-227286 A | 9/2007 |
| JP | 2007-329114 | 12/2007 |
| JP | 2010-45029 A | 2/2010 |
| WO | WO 2007/026943 A1 | 3/2007 |

* cited by examiner

US 9,182,538 B2

PLANAR LIGHT SOURCE DEVICE AND DISPLAY APPARATUS INCORPORATING SAME

The present application is a continuation of U.S. patent application Ser. No. 12/570,732, filed on Sep. 30, 2009, the entire contents of which are herein incorporated by reference.

BACKGROUND OF THE INVENTION

1. Field of the Invention

The present invention relates to a planar light source device from which light is shined on the rear or back side of a display element such as a liquid crystal display, and to a display apparatus incorporating the same.

2. Description of the Related Art

As disclosed in, for example, Japanese Patent No. 3427636 (hereinafter called Patent Document 1), a conventional planar light source device is provided with a cone-shaped recess having a triangular cross section at the rear center of a light guide plate, in which recess a light source is disposed. In such a planar light source device as disclosed in Patent Document 1, the amount of light is small toward the front of the light source. However, light intensity at a portion of the above cone-shaped recess can be higher than that at the rest of portions, so that uniformities of intensity distribution cannot in some cases be achieved.

Furthermore, a planar light source as disclosed in Japanese Unexamined Patent Publication No. H10-82916 (hereinafter called Patent Document 2) is provided with a truncated cone-shaped recess for disposing the light source therein at the rear face of the light guide plate, and in the recess is disposed a light source such as an LED, and above the light source is placed a hyperbolic light reflective surface. However, a problem with such a planar light source device as disclosed in Patent Document 2 is that light emitted toward the front of the light source is mostly absorbed by the light reflective surface, thus resulting in reduction in light utilization efficiency. Still furthermore, in a liquid crystal display device as disclosed in Japanese Unexamined Patent Publication No. H10-104620 (hereinafter called Patent Document 3), a groove is formed on the bottom in the center of a light guide plate in parallel with longitudinal sides of the light guide plate, in the groove is accommodated a cold-cathode fluorescent lamp, and on the bottom of the groove is formed a light-transmission adjusting film. However, a problem with such a liquid crystal display device as disclosed in Patent Document 3 is that although direct light emitted from a cold-cathode fluorescent lamp is adjusted by the light-transmission adjusting film, the light is not diffused adequately, thus causing intensity irregularities at the front of the light source.

Still further, in a back light device as disclosed in Japanese Unexamined Patent Publication No. 2007-149451 (hereinafter called Patent Document 4), a light source hole part for accommodating the light source is provided on the rear side of a light guide plate, and a recess is provided on a light exit surface located opposite the hole part. The Patent Document 4 also discloses that the recess is of a cone shape, having a conical surface, combined with a cylinder; of a square pyramid shape, having a plurality of oblique faces, combined with a quadrangular prism; or of a hexagonal pyramid shape, having a plurality of oblique faces, combined with a hexagonal prism. However, a problem with such a backlight device as disclosed in Patent Document 4 is that because light emitted from the light source is transmitted radially, a part of the light, which does not propagates toward the oblique faces of the recess, exits in the proximity of the light exit surface, thereby causing intensity irregularities in the proximity of the light source.

SUMMARY OF THE INVENTION

The object of the present invention is to provide a planar light source device with highly uniform intensity and high light utilization efficiency, and a display apparatus incorporating the same.

This invention provides a planar light source device that comprises a light source; and a light guide plate that receives light from the light source and that emits from its exit surface the received light as a surface emitting light, the light guide plate including a first recess formed on the exit surface, a bottom of the first recess being disposed opposite the light source, and a refraction part, disposed on the bottom of the first recess, that refracts light passing through the bottom toward a side of the first recess so that the light passed therethrough enters the side of the first recess.

Further, according to the present invention, a planar light source device is provided which comprises a light source; and a light guide plate that propagates therewithin light from the light source and then emits from its exit surface the light as a surface-emitting light, the light guide plate including a first recess on the exit surface, the first recess being cone-shaped, a second recess that is located opposite the first recess, the light source being accommodated in the second recess, and a convexed portion on a bottom of the second recess, the convexed portion having a transmission capability and extending toward an opening of the second recess.

These and other features, advantages and objects of the present invention will be further understood and appreciated by those skilled in the art by reference to the following drawings.

DETAILED DESCRIPTION OF THE PREFERRED EMBODIMENTS

Figure 1:
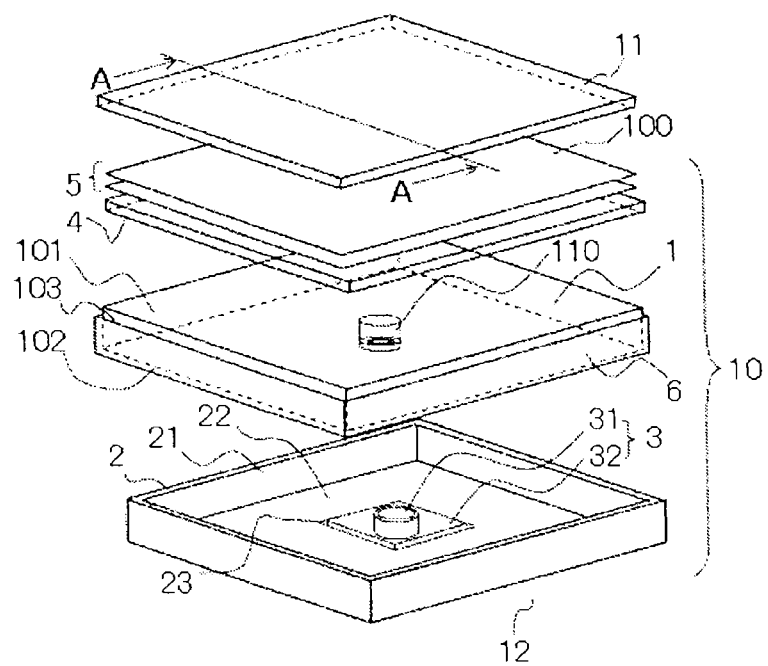
FIG. 1 is an exploded perspective view of a planar light source device according to Embodiment 1 of the present invention.

A configuration according to a non-limiting embodiment of the present invention will be described below. The same reference numerals refer to like elements in all figures.

Embodiment 1

Figure 2:
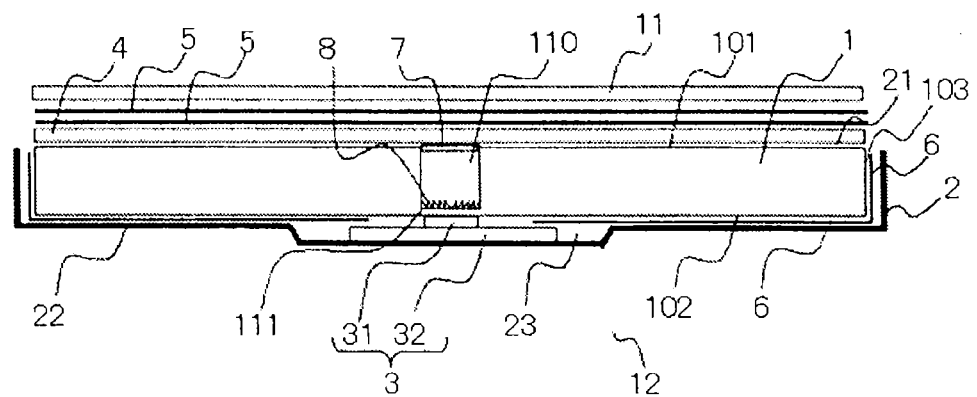
FIG. 2 is a cross sectional view of the planar light source device taken along the line A-A of FIG. 1 according to Embodiment 1 of the present invention.

FIG. 1 is an exploded perspective view of a display device according to the present embodiment; FIG. 2 is a cross sectional view taken along the line A-A of the FIG. 1 with the display device of FIG. 1 assembled. As shown in FIGS. 1 and 2, a planar light source device 10 according to Embodiment 1 includes a light guide plate 1 for guiding light, across the planar area of the light guide plate, to emit it from an exit surface 101 as a surface emitting light; the light guide plate is disposed within a housing having an opening 21. Further, a light source 3 is placed in a recessed space 23 formed on an inside bottom 22 of the housing 2; on a place located toward the exit surface 101 of the light guide plate 1 are disposed a diffuser plate 4 and an optical sheet 5. A reflective sheet 6 for reflecting light is provided on an opposite surface 102, which is a surface located opposite the exit surface 101 of the light guide plate 1, and on sides 103 of the light guide plate. On such the planar light source device 10 is disposed a display element 11 to constitute a display device 12. The display element 11 may employ a display panel, such as a liquid crystal display panel to which birefringence of liquid crystal is applied, or a display panel where letters or pictures are printed on a transparent plate. In the present embodiment, the display element 11 uses the liquid crystal panel, as will be described below.

Liquid crystal display panels include a color filter substrate formed thereon with a color filter, a light-shielding layer, an opposite electrode and the like; and a thin-film transistor (hereinafter called TFT) substrate disposed opposite to the color filter substrate and formed thereon with TFTs serving as switching elements, pixel electrodes and the like. The liquid crystal display panel includes a spacer for maintaining a gap between both substrates, a sealing material for adhering the color filter substrate and the TFT substrate together, and a liquid crystal sandwiched between the color filter substrate and the TFT substrate. The display panel also includes a sealing compound for an inlet through which the liquid crystal is filled, an orientation film for orientating the liquid crystal, and a polarization plate. In the liquid crystal display panel, the orientation of a liquid crystal layer is varied by the switching element turning on/off the voltage, whereby incident light on the liquid crystal display panel is modulated according to imaging signals, and displayed as red (R), green (G) and blue (B) colors.

The light source 3 may employ a point source of light such as a light emitting diode (hereinafter called LED) or a laser diode. In the present embodiment, an LED light source where the LED 31 is contained on a light source substrate 32 is used for the light source 3, as will be described below. Examples of LEDs include semiconductor light emitting elements that emit a single color such as a color blue, and "pseudo-white" LEDs that include a fluorescent substance partially absorbing a color blue emitted from the semiconductor light emitting element and emitting yellow light. There is another LED in which red, green, and blue light emitting elements are provided and white light is emitted by combining the three primary colors from the elements. In the present embodiment, an example of using the pseudo-white LED will be described.

The light guide plate 1 may be configured by a planar and transparent acryl resin, polycarbonate resin, glass and the like. The light guide plate 1 causes incident light to propagate therewithin and then to exit from the exit surface 101 so that the incident light is to exit, as surface emitting light, through the exit surface 101. In the light guide plate 1 to be used in the present embodiment, a first recess 110 is formed approximately in the center of the exit surface 101. The first recess 110 is cylindrical, and on a bottom 111 of which is provided a refraction part 8 that refracts incident light from the light source 3 in a direction away from the center O of a circle at the bottom 111. Further, the opposite reflective surface 102 is formed with a light scattering portion for guiding light to the exit surface 101. The light scattering portion, which serves as means that reflects light toward the inside of the light guide plate 1, can be formed by a method of dot-printing on the opposite surface 102, forming a grained surface by roughing the opposite surface 102, forming micro-spherical surfaces or surface asperities thereon, or the like.

Figure 3:
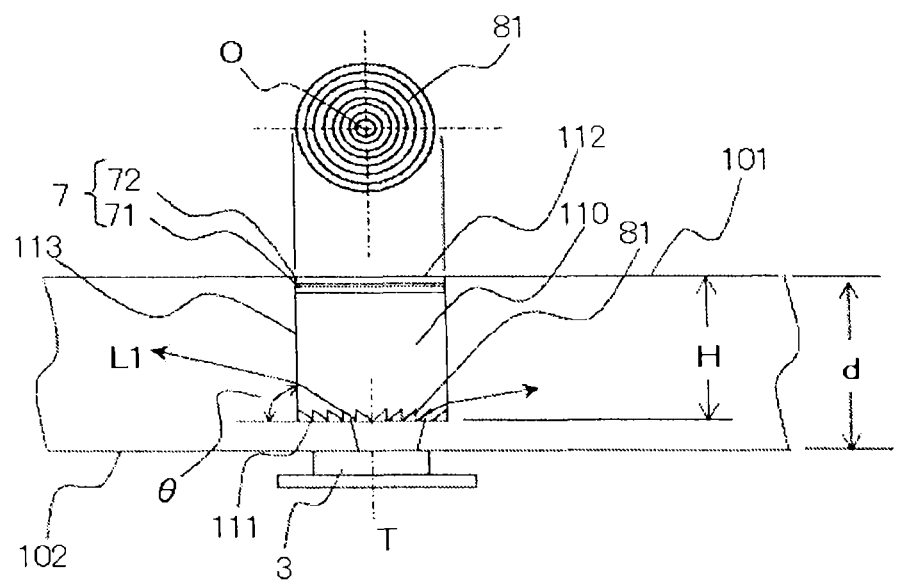
FIG. 3 is a view illustrating a chief part of FIG. 2 according to Embodiment 1 of the present invention.
Figure 4:
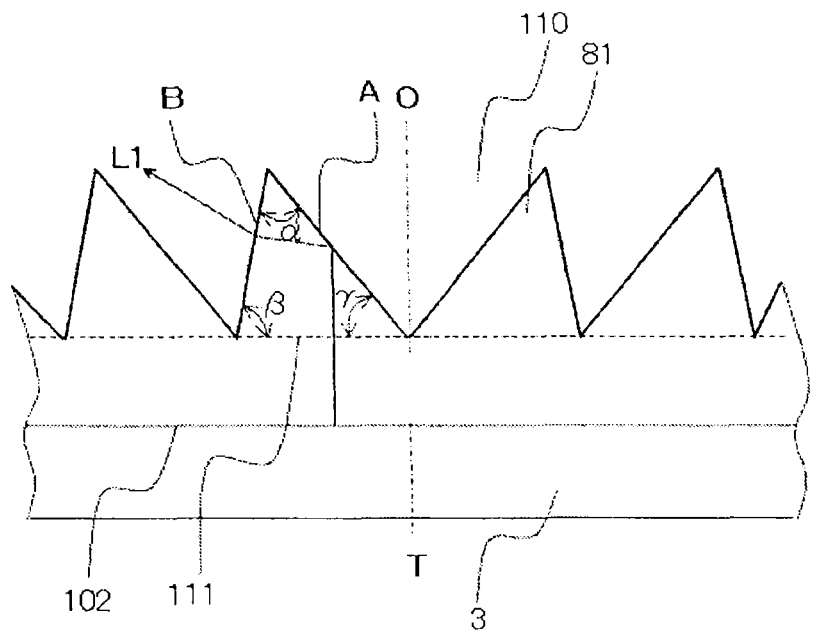
FIG. 4 is an enlarged view of the chief part of FIG. 2 according to Embodiment 1 of the present invention.

FIG. 3 is a view illustrating the first recess 110 formed in the light guide plate 1, the view including an enlarged view of the chief part of the first recess 110 of the light guide plate 1 as shown in FIG. 2 and a plan view of the first recess 110 as viewed from the top. As shown in FIG. 3, in Embodiment 1, the refraction part 8, which is formed on the bottom 111 of the first recess 110, is configured by a prism array 81 that is formed with a plurality of circles each having a center O at the central portion of the bottom 111 and each of whose cross sections is a triangle. The prism array 81 is formed by concentric circles each of whose cross sections is a triangle. Here, the center from which light is emitted is defined as a light emission center T throughout the specification. The light source 3 is disposed in face-to-face relation with the opposite surface 102, at a location where the center O of the Prism array 81 coincides with the light emission center T of the light source 3. A light intensity adjusting film 7, which is constituted of a reflective sheet 71 and a diffusion sheet 72, is disposed in the opening 112 for the first recess 110 in the light guide plate 1. FIG. 4 shows an enlarged view of the Prism array 81. The configuration of the prism array 81 will be described with reference to FIG. 4. In this specification, a side, located toward the center O, of the cross-sectionally triangular portion constituting the prism array 81 is defined as side A; and the other side located away from the center O, as side B. A first internal angle, located opposite the bottom 111 (shown in FIG. 3 and corresponding to broken lines in FIG. 4), is defined as an apex angle α; a second internal angle formed between the side B and the bottom 111, as a basic angle β; and a third other internal angle formed between the side A and the bottom, as a basic angle γ. Next, the path of light emitted from the light source 3 will be described referring to FIGS. 3 and 4. A light ray L1 emitted from the light source 3 enters the opposite surface 102 of the light guide plate 1, to reach the prism array 81. Most of the light having reached the prism array 81 totally internally reflects by the side A and then is refracted on the side B in a direction away from the center O, and finally exit to the air within the recess 110 of the light guide plate 1. The light ray L1 having entered the air within the first recess 110 of the light guide plate 1 enters again the light guide plate 1 through a side 113 of the first recess 110. The light ray L1, which has entered the light guide plate 1 through the side 113 and then has been oriented to propagate across the planar area of the light guide plate 1, travels within the light guide plate 1 by total internal reflection from interfaces between the light guide plate 1 and its surrounding air. When reaching a dot pattern printed on the opposite surface of the light guide plate 1, the light ray L1 having propagated within the light guide plate 1 is diffusely reflected by the dot pattern and then varies its propagation direction. Because of the variation in the propagation direction, the incident angle of the light reaching the interfaces between the light guide plate 1 and its surrounding air becomes not to exceed the critical angle of incidence, and then the light is caused to emit through the exit surface of the light guide plate 1.

As described above, the provision of the refraction part 8 in the first recess 110 of the light guide plate 1 allows the light ray L1, having reached the refraction part 8 from the light source 1, to be refracted in a direction away from the center O, and then to enter the side 113 of the first recess 110. The light ray L1 having entered the light guide plate 1 through the side 113 is oriented to propagate across the planar area of the light guide plate 1; thus, the light ray L1 can efficiently travels within the light guide plate 1 by total internal reflection from the interfaces between the light guide plate 1 and its surrounding air, thereby allowing uniform surface emitting light having propagated within the light guide plate 1 to emit through the exit surface 101. The light to exit from the sides 103 and the opposite surface 102, other than the exit surface 101 of the light guide plate 1, reflects by the reflective sheet 6 as shown in FIG. 2, then enters again the light guide plate 1 to propagate therewithin, and finally exits through the exit surface 101 of the light guide plate 1. The light that reaches the prism array 81 will partially travel toward an opening 112 and exit through the opening 112. By the light intensity adjusting film 7 disposed in the opening 112 (as will be described later), the light traveling toward the opening 112 can be controlled to be light that enters again the light guide plate 1, or exits through the opening 112. Here, with the angles of each cross sectional triangle constituting the prism array 81, the basic angle β is made to be 45 degrees or more 90 degrees or less, while the basic angle γ is made to be 45 degrees or more. Further, the relationship between these two angles is established so that the basic angle β is greater than the basic angle γ. With this relationship established, the light to reach the prism array 81 can efficiently be totally internally reflected from the side A and be refracted in a direction away from the center O on the side B.

The depth H of the recess 110 of the light guide plate 1 can be defined as: $H=(d/2) \times \tan \theta$ where an angle of light to emit through the prism array is represented as θ and the thickness of the light guide plate 1 is represented as d.

As depicted in FIG. 3, the light intensity adjusting film 7 disposed at the opening of the recess 110 of the light guide plate 1 is configured by the reflective sheet 71 (having reflection capability to reflect the light emitted from the light source 3) and the diffusion sheet 72 (having diffusion capability to diffuse the light from the light source 3), each of the sheets 71 and 72 being disposed with an air layer therebetween. The light intensity adjusting film 7 can control light having emitted from the light source 3 to travel toward the opening 112, is to be reflected by its reflection capability to enter again the light guide plate 1, or to be diffused by its diffusion capability and to exit through the opening 112, thus avoiding intensity irregularities on the exit surface 100 of the planar light source device 10.

The reflective sheet 71 may employ a material made by mixing polypropylene, or polyethylene terephthalate (PET) with barium sulfate or titanium oxide, a material made of a resin foam with micro-bubbles, a material made by evaporating silver onto a metal plate, or a material made by applying paint containing titanium oxide to a metal plate. In the present embodiment, the reflective sheet 71 is used that is formed of a material made of a PET resin having micro-bubbles. The reflective sheet 71 using the PET resin reduces its transmission factor as the sheet 71 becomes thicker, but can increase its reflectivity, while the sheet 71 reduces its reflectivity as it becomes thinner, but can increase its transmission factor.

Figure 5:
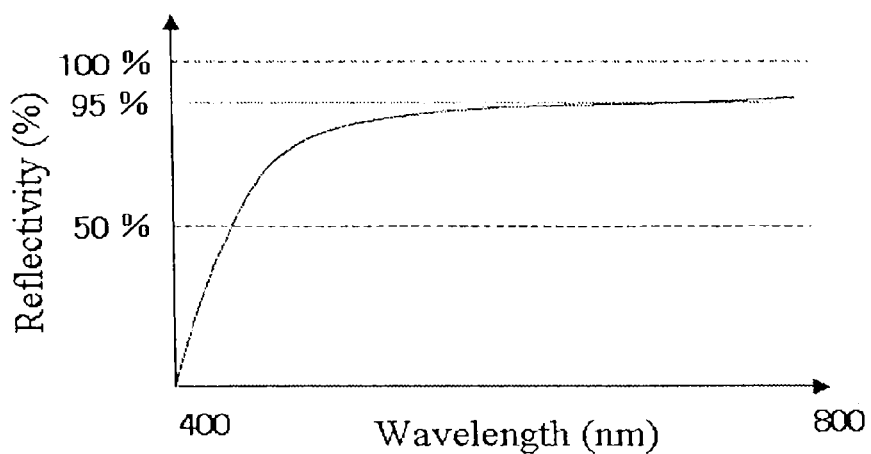
FIG. 5 is a graph illustrating a reflective characteristic of a reflective sheet according to Embodiment 1 of the present invention.
Figure 6:
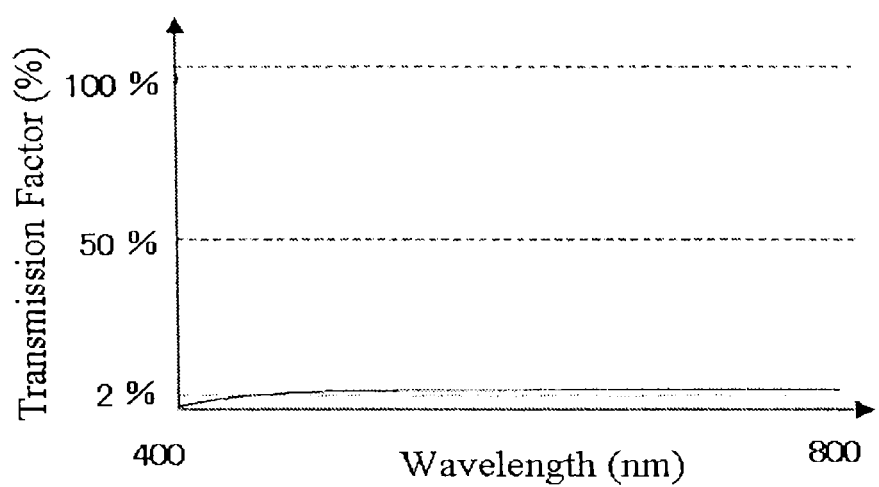
FIG. 6 is a graph illustrating a transmission characteristic of the reflective sheet according to Embodiment 1 of the present invention.

Further, the reflective sheet 71 to be used in the present embodiment has a reflection property as shown in FIG. 5, and a transmission property as shown in FIG. 6. As shown in FIG. 6, a reflective sheet whose total light transmission factor—expressed by a percentage of light passing through the sheet against all incident light on the sheet—is 2% or more, is used as the reflective sheet 71. The use of the reflective sheet with its total light transmission factor of less than 2% can in some cases reduces the amount of light exiting through the opening 112 of the first recess 110 of the light guide plate 1, thereby causing intensity irregularities of the emitting light at the exit surface 100 of the planar light source device 10; however, the use of the reflective sheet 71 having its total light transmission factor of 2% or more, preferably, 4 to 6%, can suppress the reduction in the amount of light to exit through the opening 112. The light transmission factor of the reflective sheet 71 is adjusted, as deemed appropriate, so that the total intensity irregularities may not occur at the opening 112.

Further, the diffusion sheet 72 as shown in FIG. 3 may be formed of light transmissive material, like a glass substrate or resin substrate such as PET, polymenthyl methacrylate (PMMA), or polycarbonate (PC), with a reflective substance contained therein or with a roughed portion on its surface providing a capability of diffusing incident light. Placement of the diffusion sheet 72 allows the light, which has passed through the reflective sheet 71, to exit as diffusion light through the opening 112.

Here, the reflective sheet 71 may possess a diffusion capability to exit light as diffused light. For instance, by using the reflective sheet 71 is used in which a material where microbubbles are formed within PET resin is employed, light reflecting by the reflective sheet 71 and passing therethrough can be diffused. Even if the first recess 110 placed in the light guide plate 1 is formed shallowly (i.e., configured to be short in depth), the intensity irregularities on the exit surface 101 can be avoided. Thus, the light guide plate 1 is allowed to be thinner, which thereby provides a thin-version of the planar light source device 10.

Here, when the light source 3 uses an LED for emitting single color such as red (R), green (G), or blue (B), the LED has a narrow half-value width in an emission spectrum, and a narrow emission line other than those of red (R), green (G), and blue (B). Consequently, when the light source uses the LED for emitting a single color, as compared with the situation where a cold-cathode tube having an emission spectrum of light other than red (R), green (G), and blue (B) is used, the variation of chromaticity due to absorption of light of a shorter wavelength by the reflective sheet 71 tends to become larger. Thus, color irregularities that are not much visible when the cold-cathode tube is used as the light source, becomes easily visible when an LED emitting a single color is used thereas. Because the light of a shorter wavelength is absorbed by the reflective sheet 71, the light having passed therethrough has a large red content—light of a longer wavelength—and becomes yellowish light, so that color irregularities may in some situations occur between emitting light of a portion where the light intensity adjusting film 7 of the light guide plate 1 is placed and exit light of the rest of portions. To avoid the color irregularities, a black dot pattern, or a color dot pattern may be printed on the reflective sheet 71. For the dot pattern printing, fine-patterns are printed on the reflective sheet 71 using a black or color ink. The pattern printing can be done by screen printing techniques. Preferably, the shape, size, arrangement, color shade, density, color and the like, of a dot pattern to be printed are optimized in consideration of displayed quality on the exit surface 100 of the planar light source device 10.

Figure 7:
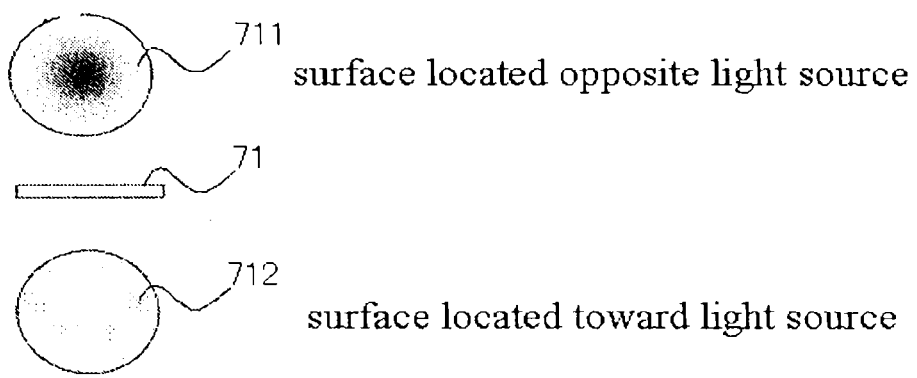
FIG. 7 is a schematic diagram of the reflective sheet according to Embodiment 1 of the present invention.

FIG. 7 shows an example of printing on the reflective sheet. As shown in FIG. 7, a color dot pattern concentrated in the center of the reflective sheet 71 is printed on a surface of the sheet 71, located opposite the light source 3, the surface being designated by numeral 711. A uniformly arranged black dot pattern is printed on a surface of the reflective sheet 71, located toward the light source 3, the surface being designated by numeral 712. By printing the color dot pattern on the surface located opposite the light source 3, the color irregularities of the emitting light can be reduced on the exit surface 100. Moreover, by printing the black dot pattern on the surface 712 of the reflective sheet 71, part of light that will cause color irregularities can be absorbed to thereby avoid occurrence of the color irregularities. Furthermore, the color dot pattern to be printed on the surface 711 of the reflective sheet 71 is made to be a dot pattern of blue that is a complementary color to accommodate a variation of a color tone due to light passing through the reflective sheet 71, whereby the color irregularities due to the light intensity adjusting film 7 can be limited or reduced.

Further, as compared with light having emitted from the light source 3 and entered, through the prism array 81, the air within the recess 110 of the light guide plate 1, light—which propagates through the prism array 81 toward the opening 112 and is cause to reflect by the light intensity adjusting film 7 disposed in the opening 112, and again enters the side 113 of the recess 110 of the light guide plate 1—becomes apt to emit through the exit surface 101 in the neighborhood of the opening 112, depending upon its incident angle. For avoidance of such light from exiting through the exit surface 101, a black dot pattern may be printed on the surface of the reflective sheet 71 located toward the light source 3. Absorbing the light by the black dot pattern can avoid the intensity irregularities on an exit surface 101 in the neighborhood of the opening 112. A similar advantage can be achieved when a black or color printing similar to that of the reflective sheet 71 is made on the diffusion sheet 72.

While in the present embodiment, a color printing is made on the reflective sheet 71, a similar advantage can be achieved by disposing, in place of the color printing, a color filter sheet on a surface of the reflective sheet 71 located opposite the light source. Examples of the color filter sheet, which is a sheet through which only light of a specific wavelength is caused to pass, includes a translucent color cellophane film or the like. The use of the color filter sheet having a higher transmission factor for the light of shorter wavelengths than that for light of longer wavelengths can reduce color irregularities of light passing through the reflective sheet 71 described above.

As described thus far, in the planar light source device 10 according to the present embodiment, because the refraction part 8 is disposed which refracts in a direction away from the center O the light having reached the bottom 111 of the first recess 110 from the light source, the light having reached the refraction part 8 from the light source 3 is allowed to be refracted in a direction away from the center O and then to enter the side 113 of the first recess 110. Because being oriented to propagate across the planar area of the light guide plate 1, the light ray L1 having entered the light guide plate 1 through the side 113 can efficiently be made to travel within the light guide plate 1 by total internal reflection from the interfaces between the light guide plate 1 and its surrounding air. Thus, uniformized light having propagated across the planar area of the light guide plate 1 can be made to emit through the exit surface. Thus, the planar light source device 10 can be provided which has highly uniform intensity and high light utilization efficiency. Further, using the light intensity adjusting film 7 disposed in the opening 112 of the first recess 110, light traveling toward the opening 112 can be oriented so as to exit from the opening 112 or reenter the light guide plate 1, thus enhancing uniformity in intensity.

The light intensity adjusting film 7 according to Embodiment 1 is shown to have the reflective sheet 71 and the diffusion sheet 72 disposed together with the air layer therebetween, while the reflective sheet 71, the diffusion sheet 72 and the light guide plate 1 may be disposed without the air layer between both sheets 71 and 72 by adhering both sheets 71 and 72 together with adhesives or the like. No air layer between the sheets enables elimination of surface reflection occurring at interfaces between the air and each of the sheets, thereby increasing the amount of light to emit through the exit surface 101 of the light guide plate 1, which in turn enhances the light utilization efficiency. Further, preferably, the adhesives or the like have their transmission factor of 95% or more, and if its refractive index of the reflective sheet 71 is made to substantially coincide with that of the diffusion sheet 72, specular reflection can be reduced at interfaces between the reflective sheet 71, the diffusion sheet 72 and the adhesives. The reflective sheet 71 and the diffusion sheet 72 may be adhered partially or totally to each other with adhesives. One of each of the reflective sheet 71 and the diffusion sheet 72 is used for the light intensity adjusting film 7; however, a plurality of each of the sheets may be used. Reflective sheets of different size and type may be combined, as appropriate, to optimize the reflective sheet 71. The use of a plurality of the diffusion sheet 72 enables the light to further diffuse. The reflective sheet 71 and the diffusion sheet 72 can be placed depending on display quality on the exit surface 100 of the planar light source device 10. Here, in situations where the intensity irregularities of the emitting light from the planar light source device 10 can be avoided by merely disposing the reflective sheet 71, the diffusion sheet 72 does not need to be provided.

The light intensity adjusting film 7 may be of different shape from the opening 112 of the first recess 110, so long as the adjusting film 7 has a size large enough to be placed in the opening of the first recess 110. Further, for positioning of the light intensity adjusting film 7, a transparent sheet may be placed over the exit surface 101 of the light guide plate 1. In this case, preferably, the transmission factor of the transparent sheet is 95% or more.

Figure 8:
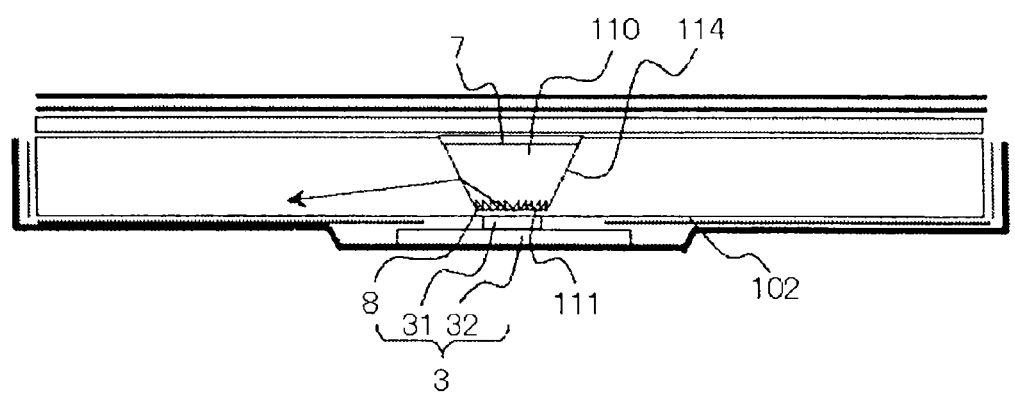
FIG. 8 is a variation of FIG. 3 (cross sectional view taken along line the A-A of FIG. 1) of the planar light source device according to Embodiment 1 of the present invention.

FIG. 8 depicts a variation of the present embodiment. Although the shapes of the first recess 110 of the light guide plate 1 is cylindrical where the bottom 111 and the opening 112 are formed to be substantially the same circle in the above embodiment, as shown in FIG. 8, the diameter of the opening 112 may be made greater than that of the bottom 111 and accordingly the side 114 can be slanted—i.e., as in truncated conical shape. At this instance, the angle formed between the side 114, which constitutes the first recess 110 of the light guide plate 1, and the bottom 111 of the first recess 10 is made to be an obtuse angle. Slanting the side 114 in this way enables most of the light entering the side 114 to be refracted toward the opposite surface 102. By thus reducing the amount of the light to enter the side 114 and then travel toward the opening 112, the light to exit in the neighborhood of the opening 112 can be reduced without propagating within the light guide plate 1, so that the intensity irregularities on the exit surface 101 can be avoided.

Figure 9:
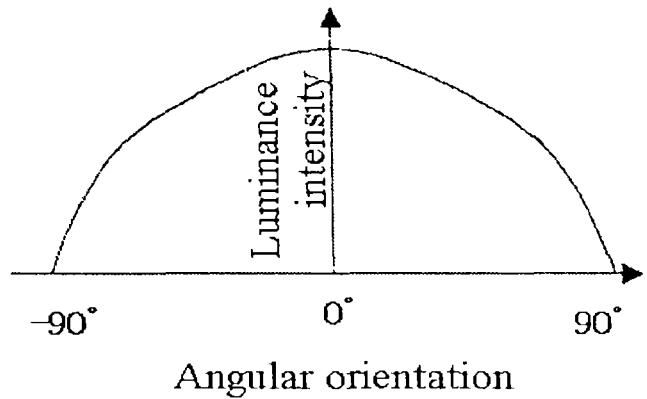
FIG. 9 is a graph illustrating a light source characteristic according to Embodiment 1 of the present invention.

FIG. 9 shows luminous intensity distribution for the light source 3 according to the present embodiment. As shown in FIG. 9, the light source 3 according to the present embodiment uses an LED 31 having typical luminous intensity distribution that is close to that of substantially total diffusion, and thereby requires no particular lens shape. Further, a light source substrate 32 used in the present embodiment retains the LED 32 and is formed with a pattern of a circuit for supplying the LED 31 with electrical power. Moreover, by implementing the circuit on the light source substrate 32 which is a metal core (hereinafter called MC) substrate, heat produced by the LED 31 can efficiently be transferred to the ambient environment. Further, by implementing it on a thin flexible printing circuit (FPC), the outer size of the planar light source device 10 can be made smaller, as well as heat from the LED 31 being able to be transferred to the ambient environment.

Moreover, in Embodiment 1, one of the LED 31 is used as the light source 3, as has been described above. The present invention is not limited to this, but can use a plurality of the light sources for needed intensity. The position to dispose the light source 3 is not limited to approximately the center of the housing, but the position can be optimally determined in consideration of the intensity distribution on the exit surface 100 of the planar light source device 10.

The planar light source device 10 according to the present embodiment disposes the reflective sheet 6 on the opposite surface 102 and the sides 103 of the light guide plate 1 so that light efficiently exits through the exit surface 100, as has been previously described. The reflective sheet 6 may employ a material made by mixing PP or PET with barium sulfate or titanium oxide, a material made of a resin foam with microbubbles, a material made by evaporating silver onto a metal plate, or a material made by applying a paint including titanium oxide to a metal plate.

Preferably, the reflective sheet 6 has its reflectivity of 90% or more. Further, by laminating a plurality of the reflective sheets 6, reflectivity can be increased, thereby enhancing intensity at the exit surface.

The diffuser plate 4 on the exit surface 101 of the light guide plate 1 may employ a material having properties to allow the light to pass therethrough, like a resin plate for PET, PMMA, PC or the like, or a glass plate. Further, the diffuser plate 4 possesses capability to cause the incident light to diffuse by working or machining such as mixing the above-described material with reflecting substance, or roughening the surface. The use of the diffuser plate 4 with such capability can provide the planar light source device 10 having wide angle diffusion. Here, the desired displayed quality can in some cases be obtained without the diffuser plate 4, depending upon the configuration of the planar light source device 10. In this case, the diffuser plate 4 does not need to be particularly provided.

Further, the optical sheet 5 placed on the diffuser plate 4 is configured with a lens sheet and diffusion sheets sandwiching them. When more enhancing luminance is required, a plurality of lens sheets each including prisms is used in which the optimal combination of orientations of the prisms is achieved. Moreover, in order to enhance diffusion of the optical sheet using only the diffusion sheet, more than two diffusion sheets may be used. Depending on properties of light intensity distribution of the lens sheet, one or no diffusion sheet may be used. Moreover, the optical sheet 5 may be used in combination with a protective sheet and a polarized reflective sheet. The configuration of the optical sheet 5 can be modified depending on desired intensity, properties of light intensity distribution, or the like.

Moreover, in order to enhance intensity, a selective reflective sheet may be disposed on the exit surface 101 of the light guide plate 1. Examples of the selective reflective sheet includes a prism sheet, a reflective polarizing sheet, or the like. The prism sheet is prism-shaped which causes the light having entered substantially perpendicularly to return to the light intensity adjusting film 7 by two total internal reflections. The reflective polarizing sheet has a polarization property, and separates incident light according to its polarization direction into reflected light and transmitted light. By providing a selective reflective sheet, light to emit through the exit surface 101 is partially reflected from the selective reflective sheet and then returned to the light intensity adjusting film 7 where the returned light is diffused again, thereby enabling the intensity and color irregularities to be reduced.

Although in the present embodiment the light guide plate 1 is plate-shaped, the present invention is not limited to this, but the light guide plate 1 may be of a wedge-like shape where the thickness thereof becomes smaller as the distance increases from the light source 1—i.e., having oppositely tapered bottoms relative to the light source. The wedge-like shape of the light guide plate 1 can efficiently guide propagating light to the exit surface 101. As a result, the provision of the reflective sheet 6 on the sides 103 of the light guide plate 1 reduces the amount of light that is to be reflected from the sheet 6, thus allowing reflection losses at the reflective sheet 6 of the sides 103 to be reduced, which in turn increases the amount of emit light through the exit surface 101.

In addition, by roughing the exit surface 101 of the light guide plate 1 to form surface asperities thereon, an advantage can be achieved which is similar to situations where means for reflecting light toward the opposite surface 102 of the light guide plate 1 is provided. That is, the light having arrived at the exit surface 101 of the light guide plate 1 is diffused in its direction to propagate, by means of the surface asperities formed on the exit surface 101. As a result, the light having entered the exit surface 101 is partially reflected therefrom toward the inside of the light guide plate 1, and the rest of light is caused to emit through the exit surface 101 to the outside of the light guide plate 1. Thus, even in a situation where the surface asperities are formed only on the exit surface 101 of the light guide plate 1, and the means for reflecting the light is not provided on the opposite surface 102, such a reflection capability can be achieved that is like the dot pattern provided on the opposite surface 102. Furthermore, a mirror finishing, surface roughing, dot pattern printing, color printing or the like treatment, may be made on the exit surface 101 or the opposite surface 102. The configuration can provide enhancement of display quality on the exit surface 100 of the planar light source device 10.

Embodiment 2

Figure 10:
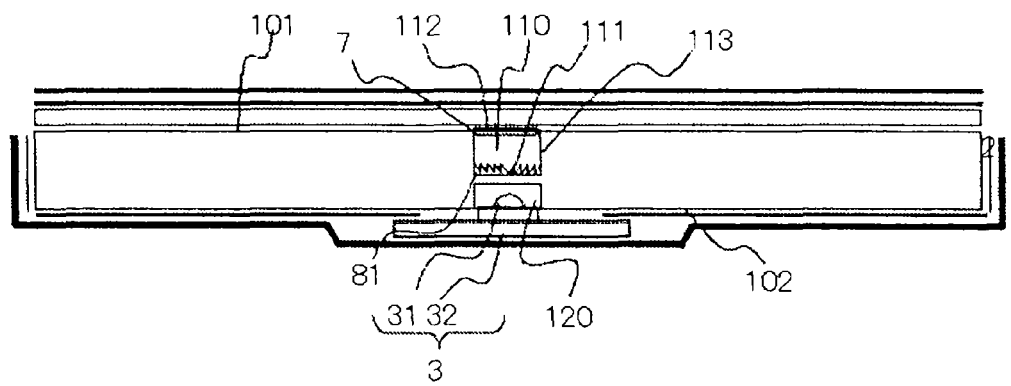
FIG. 10 is a cross sectional view of a planar light source device taken along line (like the line A-A of FIG. 1) of an exploded perspective view similar to that of Embodiment 1, according to Embodiment 2 of the present invention.
Figure 11:
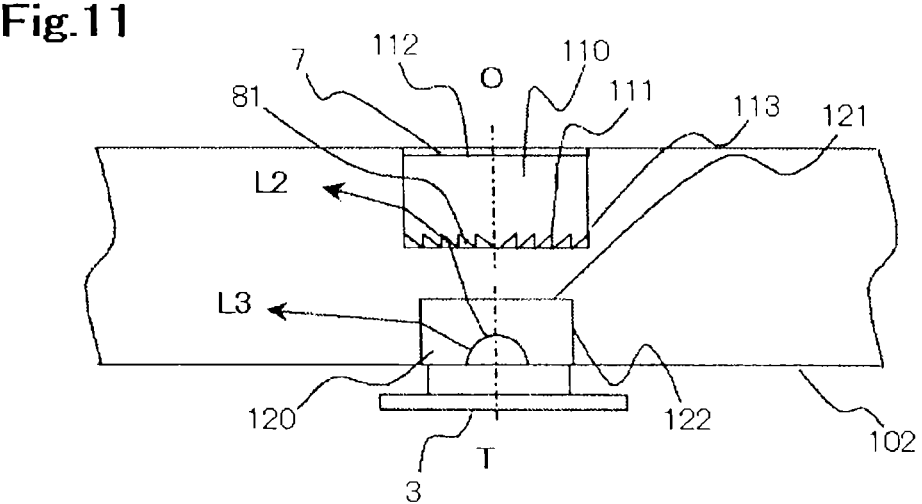
FIG. 11 is a view illustrating a chief part of the planar light source device according to Embodiment 2 of the present invention.

FIG. 10 shows a cross section of a planar light source device according to Embodiment 2; FIG. 11 shows an enlarged view of the chief part of the device. In Embodiment 1, the exit surface 101 of the light guide plate 1 is formed with the first recess 110, and the light source 3 is disposed so as to face the opposite surface 102 of the light guide plate 1, while in Embodiment 2, as shown in FIG. 10, on the opposite surface 102 is provided a second recess 120 (numeral 120 shown in FIG. 11) that is located opposite the first recess 110 of the light guide plate 1 where the light source 3 is accommodated. The configuration other than what is described above is the same as that in Embodiment 1. An advantage similar to that of the planar light source device according to Embodiment 1 is also achieved except the special advantageous feature associated with the planar light source device according to Embodiment 2, as will be described below.

The path of light having emitted from the light source 3 will be described with reference to FIG. 11. As shown in FIG. 11, a light ray L2, which has been emitted from the light source 3 in a direction substantially perpendicular to the exit surface 101 of the light guide plate 1, enters the light guide plate 1 through a bottom 121 of the second recess 120. The light L2, which has reached from the light guide plate 1 to the prism array 81 formed on the bottom 111 of the first recess 110, enters the side 113 of the first recess as refracted in a direction away from the center O of the prism array 81, as with Embodiment 1. Thus, since the light ray L2 is oriented to propagate across the planar area of the light guide plate, uniform surface emitting light having propagated within the light guide plate 1 can be made to emit through the exit surface 101. Further, a light ray L3, which travels from the light source 3 toward a side 122 of the second recess, can be caused to enter the light guide plate 1 in a direction to propagate across the planar area of the light guide plate 1, thus enhancing the light utilization efficiency. Since the light source 3 can be accommodated in the second recess 120, the thickness of the planar light source device 10 can be made smaller than that of Embodiment 1.

According to Embodiment 2, since the second recess 120 is located opposite the first recess 110, i.e., at a position disposed toward the opposite surface 102 of the light guide plate 1, and the light source 3 is located within the second recess 120, the light traveling from the light source 3 toward the side 122 of the second recess 120 can be caused to enter in a direction to propagate across the planar area of the light guide plate 1. As a result, the planar light source device 10 with a high light utilization efficiency and high intensity can be provided, thus enabling the thickness of the device 10 to be made smaller.

Here, the shape of the first recess 110 may be the same as, or geometrically similar to that of the second recess 120. The size of the first recess 110 may be greater than that of the second recess 120. The size of the second recess 120 may be varied as appropriate, such as being made greater on the opening 121 than on the bottom (unnumbered).

Further, in Embodiment 2, the light source 3 has used an LED light source having a semi-spherical lens as shown in FIG. 10. Thus, the light from an LED chip can efficiently be derived to the outside of the light source 3, thus permitting more light to be obtained with less expenditure of power. The depth of the second recess 120 is made to be substantially of the same order of magnitude as or to be slightly greater than the height of the semi-spherical lens of the light source 3, thereby providing the planar light source device of thinner type. The depth of the first recess 110 can be determined as with Embodiment 1.

Embodiment 3

Figure 12:
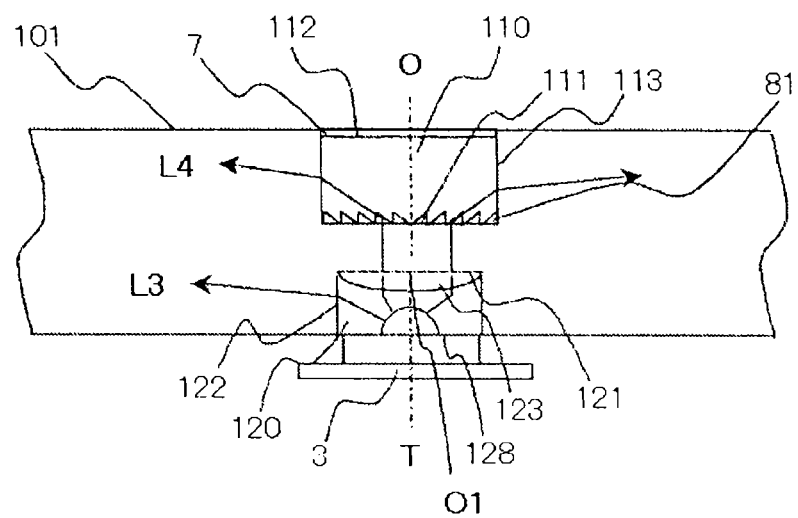
FIG. 12 is a view illustrating a chief part of a planar light source device according to Embodiment 3 of the present invention.

FIG. 12 shows an enlarged view of the chief part of a planar light source device according to Embodiment 3. The planar light source device according to Embodiment 3 has a convexed portion 123 extending toward an opening 124 formed on the bottom 121 of the second recess 120. Here, the rest of the configuration other than that of providing the convexed portion 123 is the same as that in Embodiment 2. An advantage similar to the planar light source device according to Embodiment 1 and Embodiment 2 is achieved except the advantageous feature associated with the planar light source device according to the present embodiment, as will be described below.

Figure 13:
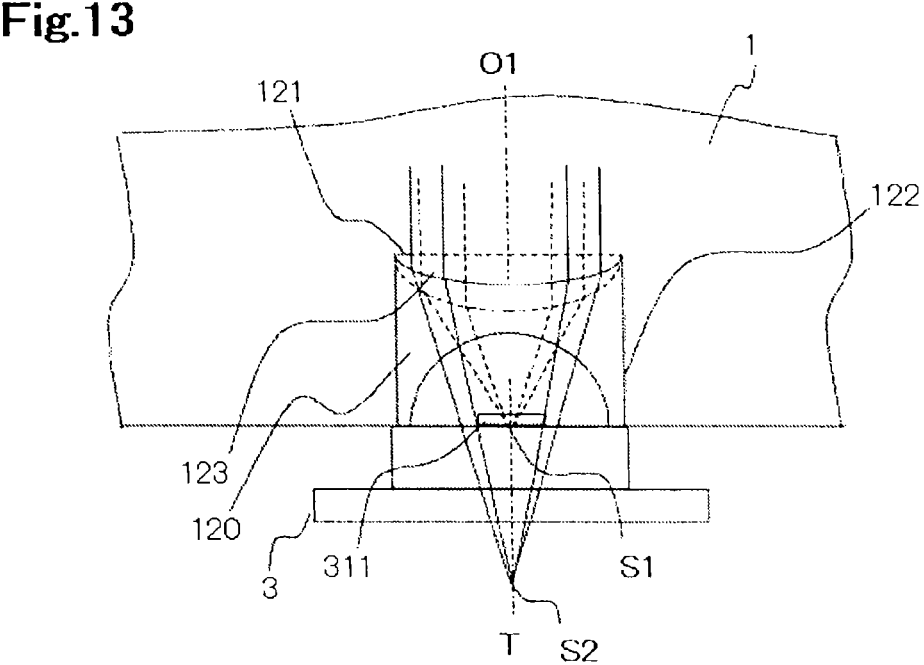
FIG. 13 is an enlarged view of the lower portion of the chief part of FIG. 12 of the planar light source device according to Embodiment 3 of the present invention.

Next, FIG. 13 shows an enlarged view of the chief part of the convexed portion 123 formed in the light guide plate. As shown in FIG. 13, the convexed portion 123 is formed integral with the bottom 121 of the second recess 120. The convexed portion 123 represents a convex lens whose center portion extends toward the opening 124 of the second recess 120 to provide a larger thickness. The light source 3 is disposed at a location where the center O1 of the second recess 120 coincides with the light emission center T of the light source 3, and the convexed portion 123 as indicated by dotted lines is formed with the light emission center T as a focal point S1 of the lens. The problem with such a configuration can be that the convexed portion 123 is difficult to form because the thickness of the portion 123 is thicker, or the side 122 connects with the portion 123 in an acute angle. In this case, the convexed portion 123 as indicated by a solid line is formed so that its focal point S2 is defined at a position away from the light emission center T of the light source 3. This configuration can avoid the side 122 from connecting with the convexed portion 123 in an acute angle, as well as allowing the thickness of the convexed portion to be made thinner, thus facilitating their molding. Here, the convexed portion 123 is formed with a curved surface, specifically, a hyperbola which satisfies the relation: $-1 < K \leq 0$ where K is Conic constant. By applying a partial curved surface of a circle which satisfies Conic constant K=0, the convexed portion 123 can be made thinner.

The distinctive feature of the light path in Embodiment 3 will be described with reference to FIG. 12. A light ray L4 entering the convexed portion 123 of the second recess 120, which passes through the curved surface forming the convexed portion 123, can then be refracted in a direction substantially perpendicular to the exit surface 101 of the light guide plate. Consequently, light that exits from the bottom (light source 3) of the second recess 120 and will not reach the prism array 81 formed on the bottom 111 of the first recess 110, can be reduced, and most of the light that is caused to exit from the convexed portion 123 can be oriented in a direction to propagate across the planar area of the light guide plate 1, and be caused to enter the side 113 of the first recess 110.

Figure 14:
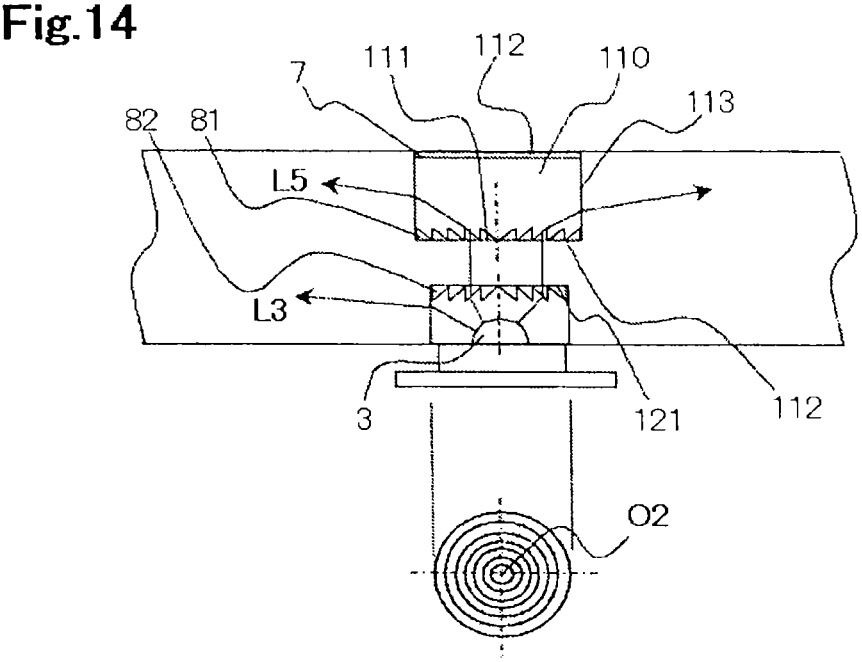
FIG. 14 is a view illustrating another chief part of the planar light source device according to Embodiment 3 of the present invention.

FIG. 14 depicts a variation of Embodiment 3. As shown in FIG. 14, in Embodiment 3, a prism array 82 is formed on the bottom 121 of the second recess 120. Here, the prism array 82 formed thereon, as with the prism array 81 formed on the first recess 110, has a triangle cross section and is formed with a plurality of circles (i.e., concentric circles) whose center O2 coincides with the central portion of the second recess 120. By forming the prism array on the bottom 121 of the second recess 120, a light ray L5 entering the prism array 82 is refracted in a direction substantially perpendicular to the exit surface 101 of the light guide plate 1 and then is caused to travel toward the prism array 81 formed on the first recess 110. Thus, using the variation of the present embodiment as well, light not to reach the prism array 81 formed in the bottom 111 of the first recess 110 can be reduced. And most of the light ray L5 that is caused to exit from the prism array 82 can be oriented in a direction to propagate across the planar area of the light guide plate 1, and be caused to enter the side 113 of the first recess 110.

Embodiment 4

Figure 15:
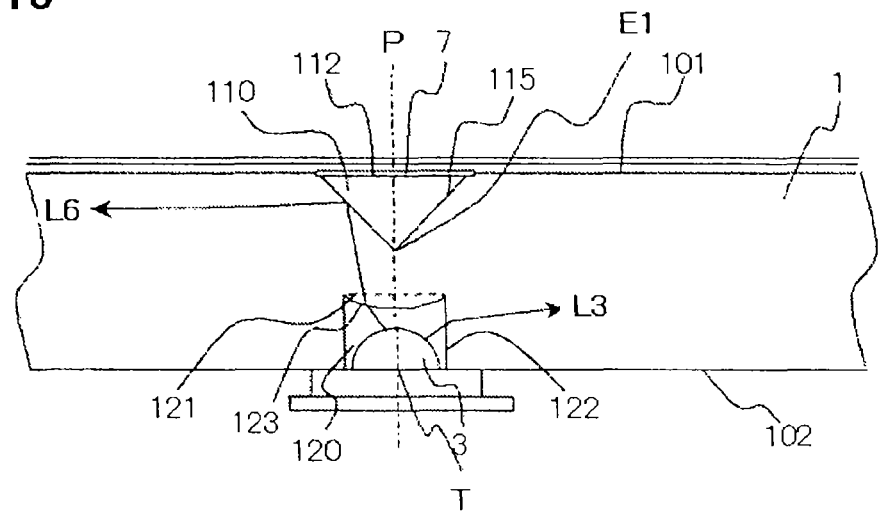
FIG. 15 is a view illustrating a chief part of a planar light source device according to Embodiment 4 of the present invention.

FIG. 15 shows a cross section of the chief part according to Embodiment 4. As shown in FIG. 15, Embodiment 1 through Embodiment 3 use the first recess 110 that is cylindrical in shape, in which case the prism array 81 is formed on the bottom 111, while Embodiment 4 uses the first recess 110 that is cone-shaped. Except for the configuration where the first recess 110 is cone-shaped, the remaining configuration is the same as those of Embodiment 1 through Embodiment 3.

Referring to FIG. 15, the first recess 110, which has an apex E1 in the normal line P extending from the exit surface 101 toward the opposite surface 102, has a cone shape whose angle of the apex E1 is approximately 90 degrees. Further, the cone shape is provided in a manner that the light emission center T of the light source 3 in the normal line P passing through the apex E1, and is integral with the light guide plate 1. The second recess 120 for accommodating the light source 3 on the opposite surface 102 is formed at a location opposite the first recess 110 of the cone shape. Here, in the present embodiment, on the bottom 121 of the second recess 120 is formed the convexed portion 123, as with Embodiment 3.

The distinctive feature of the light path in the present embodiment will be described with reference to FIG. 15. Of the light emitted from a light emitter of the light source 3, the light having entered the convexed portion 123 is refracted in a direction substantially perpendicular to the exit surface 101 by a curved surface of the convexed portion 123, and then reaches the side 115 of the cone shape first recess 110 to totally internally reflect by the recess 110. The totally internally reflected light travels in a direction to propagate across the planar area of the light guide plate 1, and propagates within the light guide plate 1 by total internal reflection from the interfaces between the light guide plate 1 and its surrounding air. When having reached the dot pattern printed on the opposite surface 102 of the light guide plate 1, after the propagation within the light guide plate 1, such light is diffusely reflected, which causes the light to vary its propagation direction and then exit through the exit surface 101 of the light guide plate 1.

As described above, the convexed portion 123 formed in the second recess 120 causes light emitted from the light source 3 to be refracted in a substantially perpendicular direction and reach a side 115 of the first recess to totally internally reflect therefrom, and thereby the light from the source 3 is made to travel in a direction to propagate across the planar area of the light guide plate 1. Thus, the planar light source device 10 can be provided in which highly uniform intensity is achieved and the light utilization efficiency is enhanced because the light can be caused to efficiently propagate within the light guide plate 1.

Figure 16:
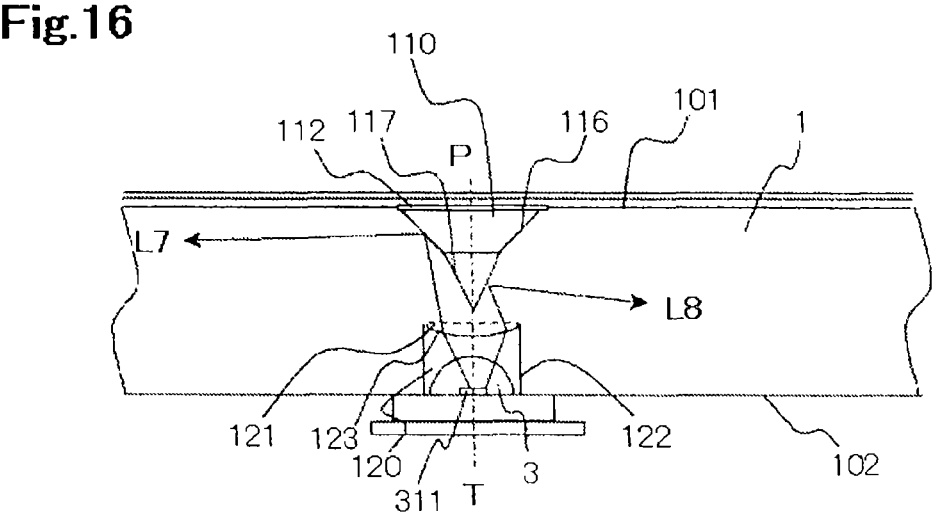
FIG. 16 is another view illustrating another chief part of the planar light source device according to Embodiment 4 of the present invention.
Figure 17:
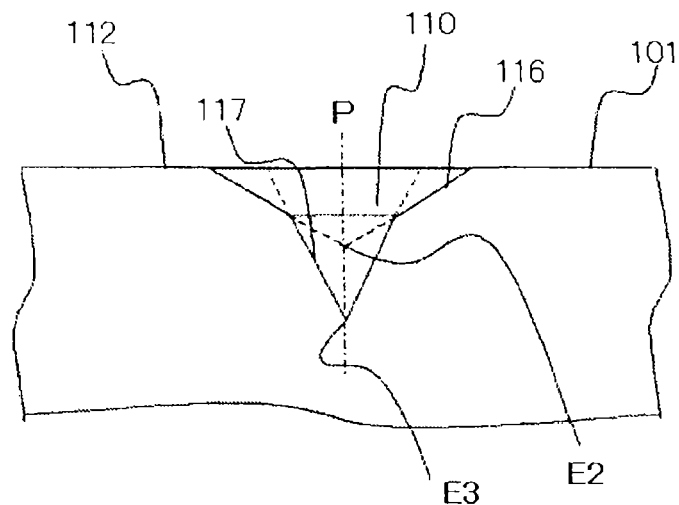
FIG. 17 is an enlarged view of the upper portion of the chief part of FIG. 16 of the planar light source device according to Embodiment 4 of the present invention.

Further, FIGS. 16 and 17 each show a variation according to the present embodiment. As shown in FIGS. 16 and 17, the first recess 110 may be configured by a combined cone-like shape—i.e., two cone shapes each defined by apexes E2 and E3 having the different apex angles and combined together to form a cone-like shape in the normal direction from the exit surface 101 toward the opposite surface 102. Here, the angle of the apex E2 is made to be greater than that of the apex E3 (i.e., E2>E3). A first cone having a side 116 defined by the apex E2 is formed in the opening 112 and a second cone is continuously formed which has a side 117 defined by the apex E3, as shown in the figure. In situations where the light emission element 311 in the light source 3 has a larger emitting area, the light emitting from a location away from the light emission center T of the light source 3 will not be directed substantially normal to the light guide plate 1 by the convexed portion 123 formed within the second recess 120. Thus, when reaching the side 115 of the first recess 110, shown in FIG. 15, the light leaks through the side 115 into the air in the first recess 100 without total internal reflection and then in some cases travels toward the opening 112. As shown by the variations of FIGS. 16 and 17, the first recess 110 is formed into the combined cone-like shape, whereby the light having reached the sides 116 and 117 constituting the first recess is enabled to totally internally reflect by the first recess 110 without being emitted into the air in the first recess 110, which results in the light traveling in the direction to propagate across the planar area of the light guide plate 1.

With the above-described configuration, the planar light source device 10 can be provided in which highly uniform intensity is achieved and the light utilization efficiency is enhanced, because most of the light, which exits from the convexed portion 123 and reaches the first recess 110, is caused to totally internally reflect from the sides 116 and 117 and then travel in a direction to propagate across the planar area of the light guide plate 1.

Embodiment 5

Figure 18:
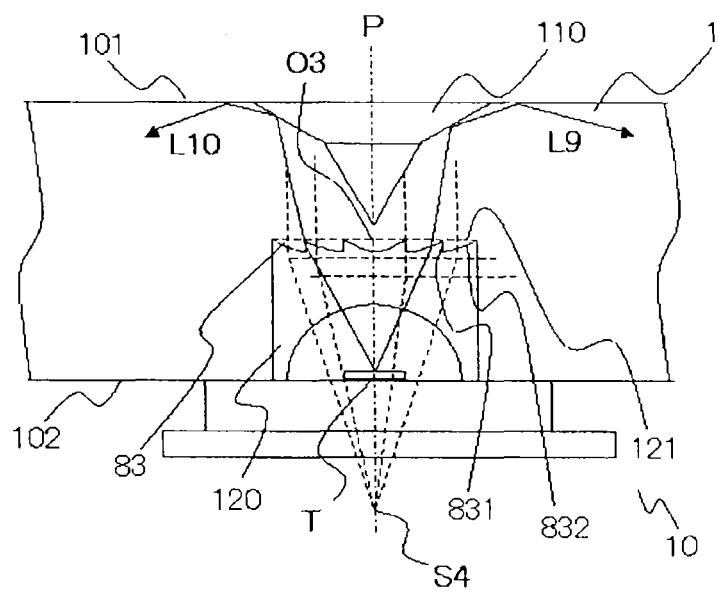
FIG. 18 is an enlarged view of a chief part of a planar light source device according to Embodiment 5 of the present invention.
Figure 19A:
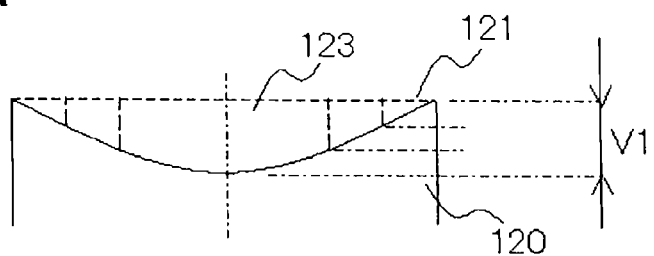
FIG. 19A shows enlarged view of the convexed portion of the chief part of FIG. 16.
Figure 19B:
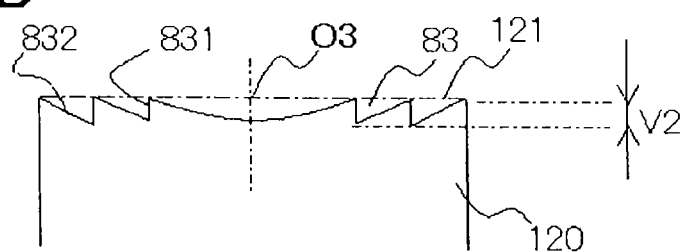
FIG. 19B shows enlarged view of a Fresnel lens of the chief part of FIG. 18, of the planar light source device according to Embodiment 5 of the present invention.

FIG. 18 is an enlarged view of a chief part of FIG. 16 of a planar light source device according to Embodiment 5 of the present invention. In Embodiment 3 and Embodiment 4, the bottom 121 of the second recess 120 is formed with the convexed portion 123 having a curved surface projecting toward the opening, while in Embodiment 5 the second recess 120 of the bottom 121 is formed with a Fresnel lens 83, as is shown in FIG. 18. The Fresnel lens 83 is a lens having a surface of curvature and light converging and diffusing capabilities, and is formed of concentric circles whose centers are located at a center O3 of the bottom 121, and integral with the bottom 121. The configuration in Embodiment 5 is the same as in Embodiment 3 and Embodiment 4, except that the bottom 121 of the second recess 120 is formed with the Fresnel lens 83. FIG. 19A shows an enlarged view of the convexed portion 123 formed on the bottom 121 of the second recess 120 in Embodiment 3 and Embodiment 4. FIG. 19B shows an enlarged view of the Fresnel lens 83 formed on the bottom 121 of the second recess 120 in Embodiment 5. As illustrated in FIG. 19B, the Fresnel lens 83 is a lens having a refraction capability provided by dividing a spherical lens into a set of concentric circular sections (i.e., ridges) with their center being at the center O3 of the surfaces projecting portion, and by decreasing the thickness of the lens. The cross section of the Fresnel lens is saw-tooth shaped that is formed by a riser surface 831, substantially perpendicular to the opposite surface 102 of the light guide 1, and a curved surface 832 connecting with the riser surface 831. Increasing the number of divisions for concentric circular sections (ridges) makes smaller the thickness of the Fresnel lens 83 per se formed on the bottom 121 of the second recess 120, thereby enabling the light guide plate 1 to be made thinner, which in turn makes the thickness of the planar light source device 10 smaller. To make smaller the thickness V1 of the convexed portion 123 shown in FIG. 19A, in Embodiment 3 the focal point S2 is established at a location spaced away from the light emission center T of the light source 3, as has been described with reference to FIG. 13. In the Fresnel lens 83 as shown in FIG. 19B, because the focal point can be established not by the thickness V2 but by a radius of curvature of the curved surface 832, the thickness V2 does not need to be large even though, as illustrated in FIG. 18, the focal point S4 is disposed at a location spaced away from the light emission center T of the light source 3. Thus, because a usable range of position to establish a focal point becomes larger than that in the convexed portion 123 shown in FIG. 19A, greater freedom of design is available.

Next, the distinctive feature of the light path in Embodiment 5 will be described with reference to FIG. 18. Of light rays emitted from a light emitting portion of the light source 3, a light ray L9 incident on the curved surface 832 of the Fresnel lens 83 from the light source 3 is refracted by the curved surface 832 in a direction substantially perpendicular to the exit surface 101 of the light guide plate 1, and then reaches the side of the first recess 110 to totally internally reflected therefrom. The totally internally reflected light travels in a direction to propagate across the planar area of the light guide plate 1, and travels within the light guide plate 1 by repeated total internal reflection from interfaces between the light guide plate 1 and its surrounding air.

Further, since the riser surface 831 of the Fresnel lens 83 is substantially perpendicular to the opposite surface 103 (or the exit surface 101), a light ray L10 having entered the riser surface 831 from the light source 3 totally internally reflects by the side of the first recess 110 after the light ray L10 has reached it, or by the exit surface 101 after the light ray has reached it at an angle of incidence to produce total internal reflection. And the light ray L10 travels in a direction to propagate across the planar area of the light guide plate 1, and propagates within the light guide plate 1 by repeated total internal reflection from interfaces between the light guide plate 1 and its surrounding air.

When the light incident on the riser surface 831 and the curved surface 832 continues propagating within the light guide plate 1 and eventually reaches the dot pattern (not shown) printed on the opposite surface 102 of the light guide plate 1, the light varies its propagation direction by diffusion reflection and then emits through the exit surface 101 of the light guide plate 1.

As described above, with the Fresnel lens 83 provided in the second recess 21 of the light guide plate 1, the light having emitted from the light source 3 and traveling toward the curved surface 832 constituting the Fresnel lens is then caused to refract so as to travel in a direction substantially perpendicular to the light source 3 to reach the side of the first recess 110 by which the light is totally internally reflected. By thus doing, the light can travel in a direction to propagate across the planar area of the light guide plate 1. Furthermore, the light having reached the riser surface 831 can be caused to totally internally reflect by the exit surface 101 and to travel in a direction to propagate across the planar area of the light guide plate 1, because the light enters the exit surface 101 of the light guide plate 1 at an angle of incidence to produce the total internal reflection. This causes light emitted from the light source 3 to efficiently propagate within the light guide plate 1, thus leading to highly uniform luminance intensity, and enhancing light utilization efficiency. In addition, by forming the Fresnel lens 83 on the bottom 121 of the second recess 120 of the light guide 1, the thickness of the light guide plate 1 can be made smaller, thus providing a thin version of a planar light source device.

Embodiment 6

Figure 20:
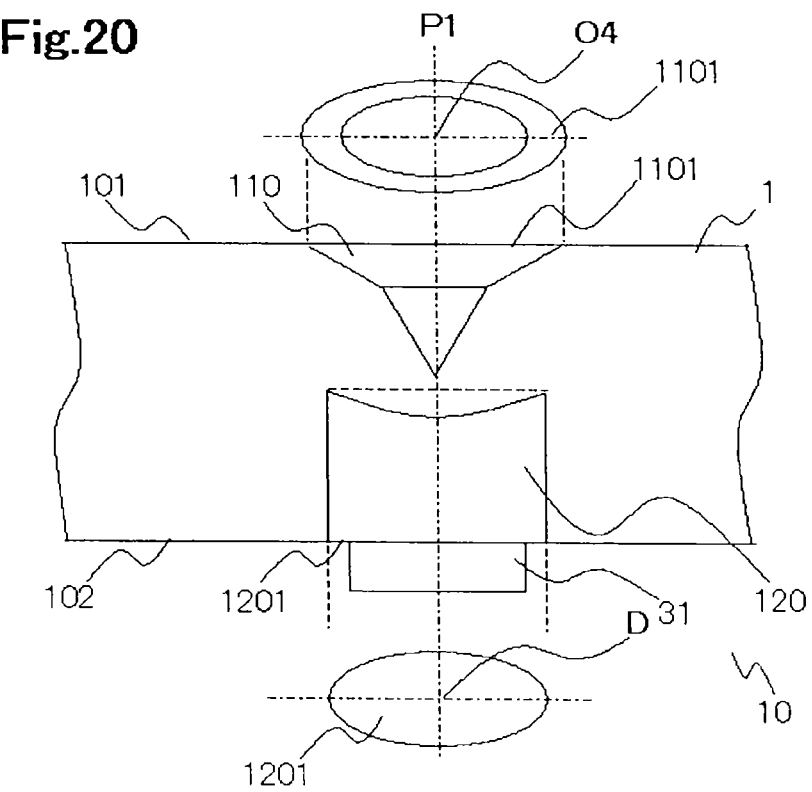
FIG. 20 is an enlarged view of a chief part of a planar light source device according to Embodiment 6 of the present invention.

FIG. 20 is an enlarged view of a chief part of a planar light source device according to Embodiment 6. In Embodiment 2 through Embodiment 5, the first recess 110 and the second recess 120, provided in the light guide plate 1, are formed of a circle, while in Embodiment 6 a rectangular light emitting element LED 31 is used as the light source 3, and the opening of the second recess 120 formed at a location where the LED 31 is placed and the opening of the first recess 110 placed opposite the second recess 120, are formed of an ellipse, as shown in FIG. 20. The configuration in Embodiment 6 is similar to that in Embodiment 1 through Embodiment 5, except that the openings of the first recess 110 and second recess 120 are ellipse shaped.

As shown in FIG. 20, the opening 1201 of the second recess 120, that is located on the opposite surface 102 and located opposite the rectangular LED 31, is formed of an ellipse. The second recess 120 is formed of an elliptical column shape where the shape of the opening 1201 is the same as that of the bottom 121 are the same. By aligning the longitudinal direction of the LED 31 with the major axis of the second recess 121, and the traverse direction of the LED 31 with the minor axis of the second recess 120, light from the LED 31 can be caused to efficiently enter the light guide plate 1. Further, the opening 1101 of the first recess 110, that is placed on the exit surface 101 of the first recess 110, and is formed at a location opposite the second recess 120, is ellipse shaped, and the major and minor axes of the elliptical opening located on the exit surface 101 are largest in size, and the size of the elliptical opening become smaller as the distance from the opposite surface 102 becomes smaller. More specifically, the more the position of axes in the first recess 110 approaches the opposite surface 102, the smaller the major and minor axes of the elliptical opening becomes and the axes eventually becomes zero at the end of the first recess—that is, the first recess 110 is elliptical cone shaped.

Here, the first recess 110 as shown is of elliptical cone like shape—i.e., two elliptical cone shapes defined by apexes having the different apex angles and combined together, as shown in the figure. A line P1 formed by connecting an elliptical center O4 of the first recess 110 with an elliptical center D of the second recess 120 is positioned so as to be substantially perpendicular to the exit surface 101, so that both centers are made to coincide.

Figure 21:
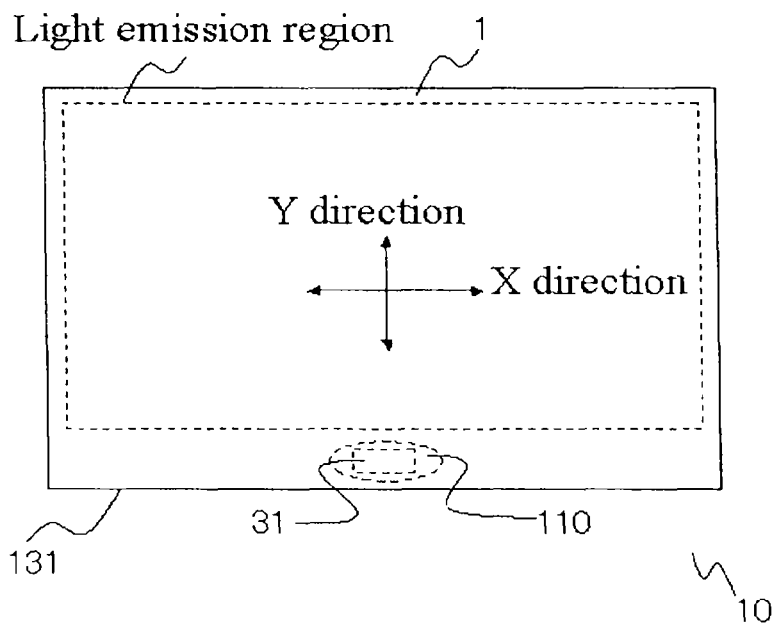
FIG. 21 is a plan view of the planar light source device, as viewed from its exit surface, according to Embodiment 6 of the present invention.

As described above, when the rectangular light emitting element LED 31 is used as the light source 3, light from the LED 31 can be caused to efficiently enter the light guide plate 1 by forming the openings of the first recess 110 and second recess 120 into an ellipse, and by aligning the longitudinal direction of the LED 31 with the major axis of the second recess 121 and the traverse direction of the LED 31 with the minor axis of the second recess 120. Further, because the first recess 110 and the second recess 120 are disposed to conform to the shape of the shape of LED 31 to be used, the planar light source device 10 can be provided in which the display quality on the side of the exit surface 101 is easily adjusted, and superior display quality is provided. FIG. 21 shows a plan view of the planar light source device 10, as viewed from the exit surface 101, according to Embodiment 6 of the present invention. In FIG. 21, the Y-axis is defined as the vertical direction, and the X-axis as the horizontal direction. In the planar light source device 10 as shown in FIG. 21, the LED 31 may be placed in the neighborhood of a side 131, outside the display region. When the housing having an aperture for display is disposed on the planar light device 10, the LED 31 is placed outside the region of the aperture. With this arrangement, since the housing is disposed above the first recess 110, light emitted from the first recess 110 does not directly emit from the exit surface 101, thus enhancing the display quality. However, a problem is that when the LED 31 is disposed at a portion of the light guide plate 1 located outside the display region, some additional area is needed outside the display region, which leads to the greater frame width.

Nevertheless, using a rectangular LED 31 the frame width can be made smaller than in the case where the openings of the first recess 110 and second recess 120 is circle shaped, by aligning the longitudinal direction of the LED 31 with the X-axis and the traverse direction thereof with the Y-axis and by forming the openings of the first recess 110 and second recess 120 into an ellipse. As a result, a planar light source device of a compact version can be provided.

Figure 22:
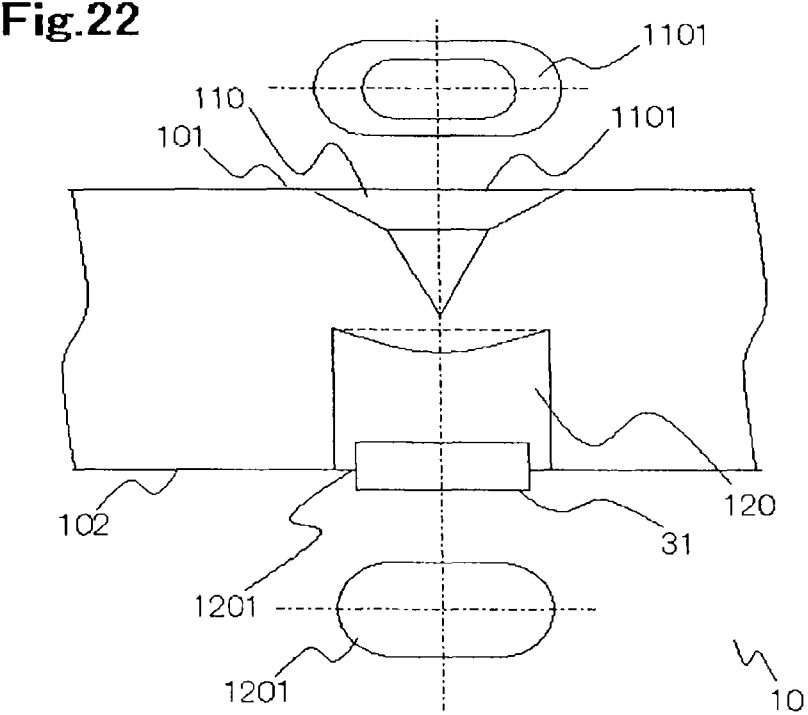
FIG. 22 is an enlarged view of the chief part of the planar light source device according to Embodiment 6 of the present invention.

FIG. 22 shows a variation of Embodiment 6 of the present invention. As shown in FIG. 22, the opening of each of the first and second recesses may be formed of an elongated hole. The elongated hole, designated at 1201, according to the present embodiment is formed by connecting two semicircles, spaced apart from each other, with two lines. With this configuration, a mold for forming the first recess 110 and the second recess 120 of the light guide plate 1 can easily be worked or machined to develop such a shape, thus enabling reduction in fabrication costs.

It will be understood by those skilled in the art that the invention is not limited to the above embodiments in accordance with the invention, and modifications or alternations in type and arrangement of the disclosed light source and light guide plate may be made without departing from the spirit and scope of the invention.

What is claimed is:

1. A planar light source device, comprising:
 a light source; and
 a light guide plate having a transmission capability that propagates therewithin light from the light source and then emits from its exit surface the light as a surface emitting light, the light guide plate including
 a first recess on the exit surface, the first recess being cone-shaped and having a closed side,
 a second recess having a closed bottom that is located opposite the closed side of the first recess, the light source being accommodated in the second recess, wherein each of the first recess and the second recess has an opening that is one of circular, elliptical and oval,
 a convexed portion on a closed bottom of the second recess, the convexed portion having a transmission capability and extending toward an opening of the second recess, the convexed portion being configured to refract light from the light source in a direction substantially perpendicular to the exit surface and to reach the closed side of the first recess corresponding to the convexed portion, to totally internally reflect therefrom, and thereby the light from the light source is made to travel in a direction parallel to the exit surface in the light guide plate,
 wherein the convexed portion formed in the second recess is a convex lens having a single focal point at a location farther away from the convexed portion than is a light emission center of the light source.

2. The planar light source device of claim 1, wherein the first recess is formed by a plurality of cone shapes each having an apex thereof in a normal direction from the exit surface toward the opposite surface, the plurality of cone shapes being combined to form a cone-like shape.

3. The planar light source device of claim 1, wherein the light source device includes at an opening of the first recess a light intensity adjusting member for adjusting an amount of light to exit from the first recess.

4. The planar light source device of claim 3, wherein the light intensity adjusting member includes a reflective sheet having a reflection capability to reflect light emitted from the light source, and a diffusion sheet having a diffusion capability.

5. The planar light source device of claim 4, wherein the reflective sheet has transmission capability of total light transmission factor of 2% or more.

6. The planar light source device of claim 4, wherein the reflective sheet has diffusion capability to diffuse light passing therethrough.

7. The planar light source device of claim 4, wherein black color printing is made on the reflective sheet.

8. The planar light source device of claim 3, wherein color printing is made on the reflective sheet.

9. The planar light source device of claim 8, wherein the color printing is made in blue color.

10. The planar light source device of claim 1, wherein the light source is a light emitting diode (LED).

11. A display apparatus comprising:
 a display element at a location facing the exit surface of the planar light source device of claim 1.

12. A planar light source device, comprising:
 a light source; and
 a light guide plate having a transmission capability that propagates therewithin light from the light source and then emits from its exit surface the light as a surface emitting light, the light guide plate including
 a first recess on the exit surface, the first recess being elliptical cone-shaped and having a closed side,
 a second recess having a closed bottom that is located opposite the closed side of the first recess, the light source being accommodated in the second recess being elliptic cylindrical, wherein each of the first recess and the second recess has an opening that is one of circular, elliptical and oval, and
 a convexed portion on a closed bottom of the second recess, the convexed portion having a transmission capability and extending toward an opening of the second recess, the convexed portion being configured to refract light from the light source in a direction substantially perpendicular to the exit surface and to reach the closed side of the first recess corresponding to the convexed portion, to totally internally reflect therefrom, and thereby the light from the light source is made to travel in a direction parallel to the exit surface in the light guide plate, wherein the convexed portion formed in the second recess is a convex lens having a single focal point at a location farther away from the convexed portion than is a light emission center of the light source, and wherein the convexed portion formed in the second recess is a prism array in which a plurality of circles each having a triangular cross section is formed on the bottom of the second recess, a center of each circle being located at a center of the recess and a light emission center of the light source.

\* \* \* \* \*